United States Patent
McVay

(10) Patent No.: US 7,036,154 B1
(45) Date of Patent: May 2, 2006

(54) GAME BIRD DECOY APPARATUS

(76) Inventor: Lynn A. McVay, #4 Dearborn Brook Cir., Exeter, NH (US) 03833

( * ) Notice: Subject to any disclaimer, the term of this patent is extended or adjusted under 35 U.S.C. 154(b) by 0 days.

(21) Appl. No.: 10/923,358

(22) Filed: Aug. 20, 2004

Related U.S. Application Data

(60) Provisional application No. 60/496,846, filed on Aug. 21, 2003.

(51) Int. Cl.
*A41D 1/02* (2006.01)
(52) U.S. Cl. .......................... 2/94; 2/DIG. 2
(58) Field of Classification Search .................. 2/456, 2/69, 84–89, 93, 94, 108, 900, 202, 244; 43/3, 2
See application file for complete search history.

(56) References Cited

U.S. PATENT DOCUMENTS

| | | | | |
|---|---|---|---|---|
| 2,437,223 A * | 3/1948 | Dutrow | ........................... | 2/94 |
| 2,501,517 A | 3/1950 | Honald | | |
| 2,711,539 A * | 6/1955 | Loscher | ........................... | 2/93 |
| 2,744,348 A * | 5/1956 | Smith | ........................... | 2/94 |
| 4,318,240 A * | 3/1982 | Hillesland | ........................ | 43/3 |
| 4,517,230 A * | 5/1985 | Crawford | ..................... | 428/17 |
| 4,581,837 A | 4/1986 | Powlus | | |
| 4,792,471 A * | 12/1988 | Lee | .............................. | 428/17 |
| 4,829,694 A | 5/1989 | Oasheim | | |
| 5,010,589 A * | 4/1991 | Hamilton | ............................. | 2/1 |
| 5,197,216 A | 3/1993 | Norris | | |
| 5,203,033 A * | 4/1993 | Sheppard et al. | ................. | 2/69 |
| 5,274,848 A * | 1/1994 | Shamblin | ........................... | 2/69 |
| 5,347,659 A * | 9/1994 | Tibljas | ............................. | 2/84 |
| 5,664,258 A * | 9/1997 | Harris | ............................. | 2/84 |
| 5,673,836 A * | 10/1997 | Bush | ........................... | 224/576 |
| 5,695,835 A * | 12/1997 | Weber et al. | .................. | 428/17 |
| 5,920,903 A * | 7/1999 | Koehntop et al. | ............... | 2/69 |
| 6,058,511 A * | 5/2000 | Finch | ......................... | 2/200.1 |
| 6,060,142 A * | 5/2000 | Rossini | ........................ | 428/52 |
| 6,127,007 A * | 10/2000 | Cox et al. | ..................... | 428/15 |
| 6,345,393 B1* | 2/2002 | Bayer | .............................. | 2/94 |
| 6,675,394 B1* | 1/2004 | Egnew | .......................... | 2/227 |
| 6,699,803 B1* | 3/2004 | Muirhead | ...................... | 442/2 |
| 6,754,910 B1* | 6/2004 | Shultz et al. | .................. | 2/244 |
| 2002/0142112 A1* | 10/2002 | Tarrell | ......................... | 428/17 |
| 2002/0152532 A1* | 10/2002 | Hardy | .............................. | 2/69 |
| 2004/0055068 A1* | 3/2004 | Egnew | ............................ | 2/69 |
| 2004/0237169 A1* | 12/2004 | Wood et al. | ..................... | 2/94 |
| 2005/0005339 A1* | 1/2005 | Johnson | ........................... | 2/69 |

* cited by examiner

*Primary Examiner*—Alissa L. Hoey
(74) *Attorney, Agent, or Firm*—Fellers, Snider, et al.; Bill D. McCarthy

(57) ABSTRACT

The present application provides a game bird decoy apparatus for sportsmen who desire to gain proximity access to wild game birds, the game bird decoy apparatus being a reversible garment having the general shape and image of a wild game bird. One of side of the game bird decoy apparatus appears as the image of one type of game bird, and the other one another type of game bird. A body portion is wearable by the sportsman, and a head portion hoods over the sportsman's head. Feather patterns or solid colors can be on the sides as desired to image various combinations of feathers and colors of wild game birds. A detachable tail portion at a lower portion of the body extends downwardly there from.

1 Claim, 2 Drawing Sheets

GAME BIRD DECOY APPARATUS

RELATED APPLICATIONS

This application claims priority to U.S. Provisional Application No. 60/496,846 filed Aug. 21, 2003, entitled Goose Decoy Garment Apparatus.

BACKGROUND OF THE INVENTION

1. Field of Invention

The present invention relates to the field of equipment for hunters, nature photographers, naturalists and the like, and more particularly but not by way of limitation, to a portable game bird decoy apparatus.

2. Discussion

There have been various types of blinds proposed in the past for concealing a person, such as a hunter, photographer or the like, who is attempting to gain stealth proximity to wildlife game, such as when attempting to get close without being detected. An example of this is when a hunter or photographer attempts to get close to an animal or bird for a hunting shot or a photography snap.

Prior art decoy apparatuses have ranged from a mere covering for a pit that was shaped like a game bird (as taught by U.S. Pat. No. 2,501,517, issued to Honald) to a hollow game bird shaped member (as taught by U.S. Pat. No. 4,581,837, issued to Powlus). Garment decoys have been worn by gamesmen that have the general outline of a bird (as taught by U.S. Pat. No. 5,197,216, issued to Norris). There are advantages and draw backs for each of these prior art approaches to gaining close proximity to game.

Of particular interest is the sport of hunting complex game birds such as, for example, geese. Consideration of the sport of hunting or photographing wild geese must begin with the fact that this sport is one of the most difficult ones when compared to most other types of game bird hunting, requiring much savvy and commitment. This applies as well to a photographer or naturalist who, like the hunter, must have a keen knowledge of the habits of these birds.

Generally, wild geese roost near rivers or lakes at night, and flocks fly to nearby fields for feeding during the day. It can be expected that flocks of geese, once acclimated to a particular area, will return day after day to the same fields until the available food supply will no longer support the flock.

While at a particular roosting spot, the flock will feed early in the morning, and to a lesser degree, late in the evening. For a hunter or a photographer desiring to maximize the opportunities afforded by the habits of geese, it is common for the members of a sporting party to arise several hours before dawn and quietly make their way to one of the feeding sites. Once concealed by some means of camouflage, the members of the sporting party await the early light of dawn and the arrival of the flock.

Typically, the flock of geese will circle the landing area, scoping out the feeding area for potential predators or other unusual activity, and if alerted to potential danger, the flock will abort landing at the site. Once the flock is on the ground, sentinel birds post themselves at the periphery of the feeding flock guarding the feeding flock.

Sportsmen positioned since before dawn around the landing site will either be in camouflaged blinds or have some other type of coverage. As the birds come into for landing at the feeding site, the concealed sportsman must move rapidly out of the blind or camouflage to quickly shoot at, or photograph, the geese. Thus, the selection of concealing means must permit the concealed person to quickly react as the flock approaches within the appropriately selected range for the sporting activity.

There is a need for an apparatus that provides a hunter, photographer or other naturalist close proximity to game birds, such as wild geese, while permitting rapid reaction to such birds once proximity access is gained.

SUMMARY OF THE INVENTION

The present application provides a game bird decoy apparatus for sportsmen and the like who desire to gain proximity access to wild geese flocks and the like. The game bird decoy apparatus is a reversible garment, each side of which forming the general shape and image of a wild goose. That is, one of an inner and an outer side of the game bird decoy apparatus presents the general image of one type of game bird, and the other one of an inner and an outer side presents the general image of another type of game bird.

The game bird decoy apparatus has a body portion that is wearable by the sportsman, and a head portion that hoods over the sportsman's head. On one side, the body portion has a feather pattern to simulate the appearance of a Canadian goose, and on the reverse side, the body portion is largely white with only the patterns of the black wing tips on each side.

A tail portion is appended to trail from a lower portion of the body portion, and is disposed to extend downwardly there from. By way of example, one side of the tail portion can be black to accompany the feather pattern typical of a Canadian goose, while the other side of the tail portion can be white to accompany the white pattern of a snow goose.

The advantages and features of the present invention will be apparent from the following description when read in conjunction with the accompanying drawings and appended claims.

DESCRIPTION

Figure 1:
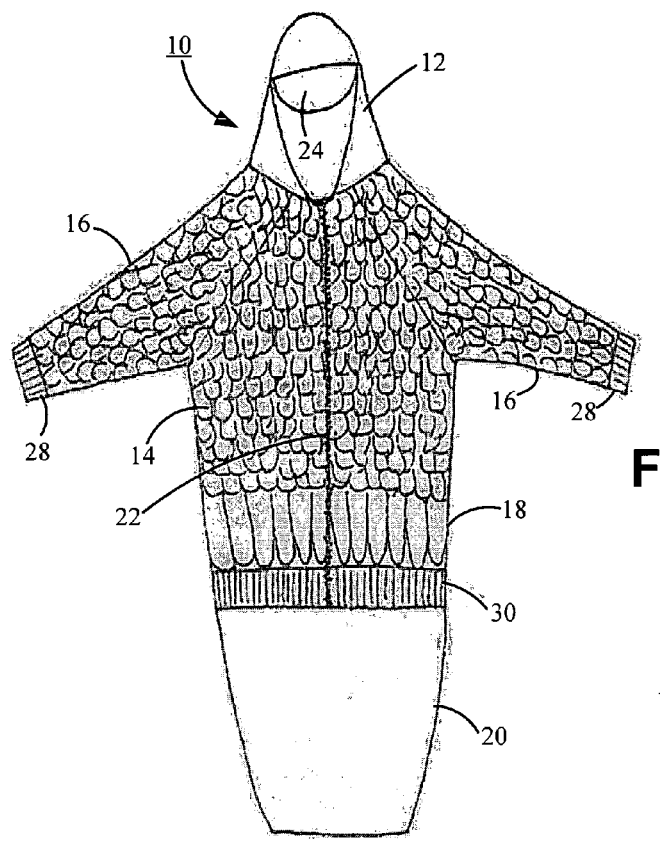
FIG. 1 is a front view of a game bird decoy apparatus constructed in accordance with the present invention.

Turning now to the drawings and more particularly to FIG. 1, shown therein is a game bird decoy apparatus 10 constructed in accordance with the present invention. The game bird decoy apparatus 10 is a garment that is designed to be donned by a hunter or sportsman seeking close proximity to a flock of game birds or the like. The word sportsman will be used herein to mean anyone who seeks to gain proximity access to game birds, which for purposes of the present disclosure will be taken as wild geese, but the invention disclosed herein is not meant to be limited thereto.

The game bird decoy apparatus has a head portion 12 in the shape of a hood, a body portion 14, a pair of arm portions or sleeves 16, a waist portion 18 and a tail portion 20. The game bird decoy apparatus 10 is designed to be worn like a garment by the sportsman, and a zipper 22 runs the length of the body portion 14 to open the game bird decoy apparatus 10 to make it easier for the sportsman to robe and disrobe. The game bird decoy apparatus has a bill portion 24 that extends forward from an upper portion of the hood 12 above the facial opening like the bill of a cap.

Figure 2:
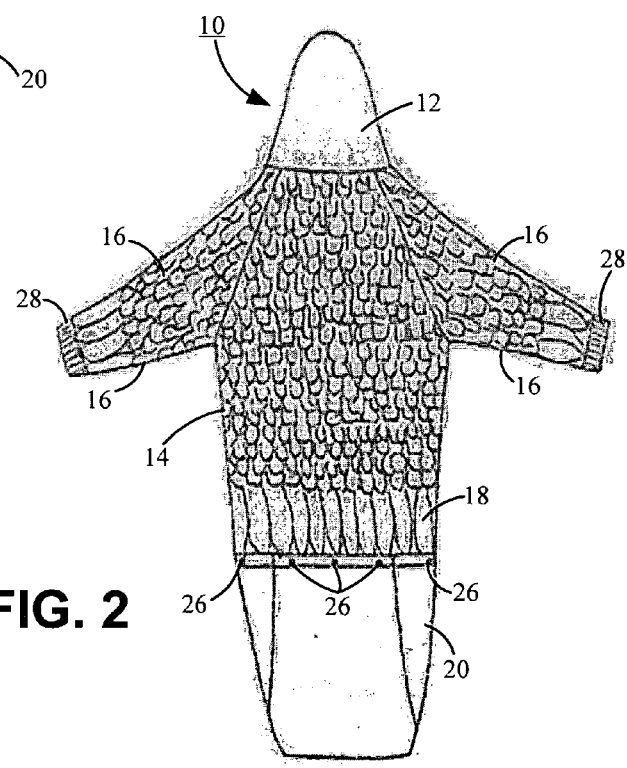
FIG. 2 is a rear view of the game bird decoy apparatus of FIG. 1.
Figure 3A:
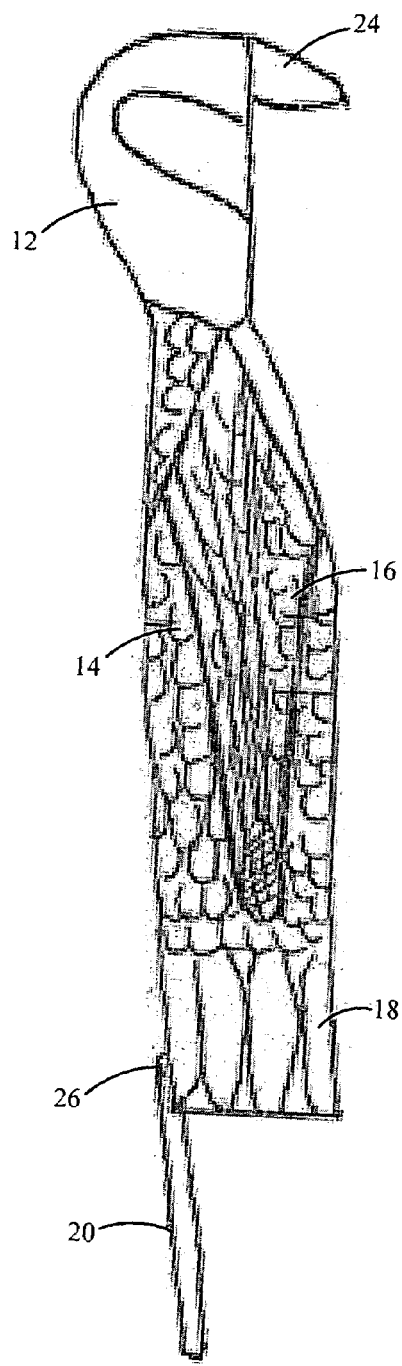
FIG. 3A is an elevational view of one side of the game bird decoy apparatus of FIG. 1.
Figure 3B:
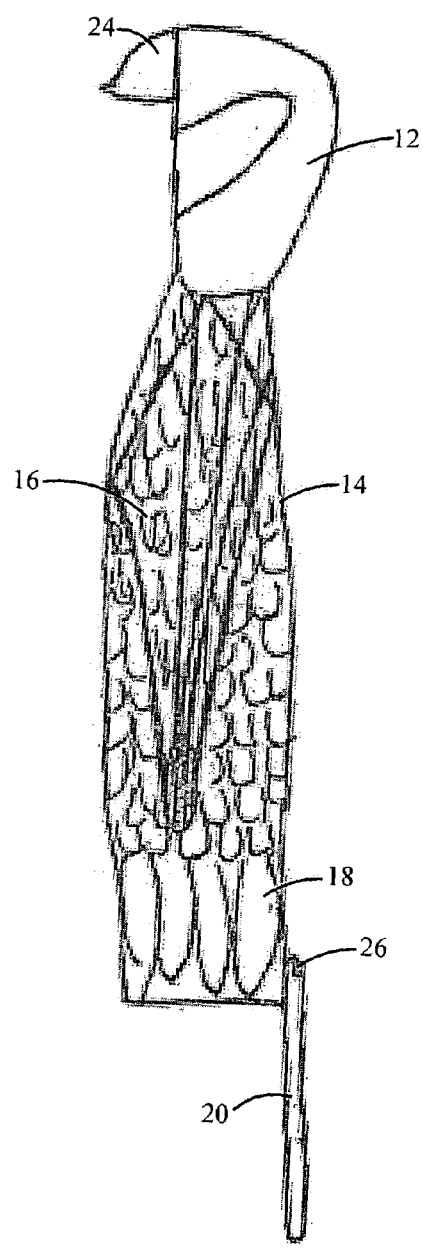
FIG. 3B is a an elevational view of the other side thereof.

FIG. 2 shows that the tail piece 20 is detachable; that is, a plurality of snaps 26 are disposed along an upper edge of the tail piece 20. Actually, only the female head portions of the snaps 26 are disposed on the tail piece 20, while the male portions of the snaps 26 are supported at a lower, rear edge of the body portion 14. This permits the removal of the tail piece 20, which is sometimes desirable, such as when the sportsman wearing the garment is posed in a sitting position or when the suit is being cleaned or folded for storage.

The game bird decoy apparatus 10 is preferably reversible, having an inner side and an outer side. As shown in the drawing figures, one side of the game bird decoy apparatus 10, such as the outer side, preferably has markings in a pattern as shown, with an array of feathers on the body portion 14, and with longitudinally extending feathers on the waist portion 18. The other side of the game bird decoy apparatus 10, such as the inner side, will preferably have a different pattern, or it may be completely one color, such as white.

While the color patterns described herein have been specified as example patterns and colors, it is not intended that the present invention be limited to such patterns and colors. Rather, it is contemplated that a number of patterns and colors can be utilized, depending on the type of game birds that are under consideration and for which camouflage is desired.

For example, waterfowl sportsmen may wear the game bird decoy apparatus 10 as a decoy for attracting geese. The game bird decoy apparatus 10, being reversible, may have one side appearing as a Canadian goose and the other side as a Snow goose. The game bird decoy apparatus 10 as shown with the feather pattern in the accompanying drawings simulates the appearance of a Canadian goose, with the inner side being white, and when worn with the inner side being turned out, the game bird decoy apparatus 10 will simulate the appearance of a snow goose.

Preferably, the game bird decoy apparatus 10 is made of a polyester material so as to be wind resistant, and can be worn as a jacket or oversized outer game bird decoy apparatus. The bill 24 is preferably firm, yet flexible, and the sleeves 16 have elastic armbands 28 at the outer ends. Also, the waist portion 18 has an elastic band 30.

The printed feather pattern, by way of example, can simulate a Canadian goose, preferably comprising an image of predominantly brown, gray and black markings on the body 14 and sleeves 16 of the game bird decoy apparatus, while the hood should be black with diagonal white bars. The tailpiece can be black with vertical white bars on each side edge.

Continuing with the example of simulating a goose, the body, sleeve and tail portions can be white in color, while the elastic armbands and the bill of the hood can be black.

It is clear that the present invention is well adapted to carry out the objects and to attain the ends and advantages mentioned as well as those inherent therein. While a presently preferred embodiment of the invention has been described in varying detail for purposes of the disclosure, it will be understood that numerous changes may be made which will readily suggest themselves to those skilled in the art and which are encompassed within the spirit of the invention disclosed and as defined in the above text and in the accompanying drawings.

What is claimed is:

1. A game bird decoy apparatus for providing a sportsman proximity access to game birds, comprising:
    a garment reversible between a first side forming the illusion of a first game bird when worn by the sportsman and a second side forming the illusion of a second game bird when worn by the sportsman, the garment comprising:
    a body portion;
    a head portion that hoods the sportsman's head;
    arm portions; and
    a removable tail portion; and
   wherein the body portion on one side of the garment having a pattern simulating the feathers of the first game bird, the body portion on the opposing side of the garment having a pattern simulating the second game bird, the arm portions on one side of the garment having a pattern simulating the feathers of the first game bird, and the arm portions on the opposing side of the garment having a pattern simulating the second game bird, the tail portion being attachable to the body portion so as to extend downwardly there from, each side of the tail portion having a color complementing one of the patterns of the opposing sides of the body portion.

* * * * *